United States Patent
Gross et al.

(10) Patent No.: US 12,435,190 B1
(45) Date of Patent: Oct. 7, 2025

(54) PLASTIC-FREE DISHWASHER CLEANING PRODUCT

(71) Applicant: Tru Earth Environmental Products Inc., Port Moody (CA)

(72) Inventors: Darren Gross, Midland, MI (US); Laura Hinojosa, Kitchener (CA); Zenith Phillips, Calgary (CA); Iryna Radziievska, Calgary (CA)

(73) Assignee: Tru Earth Environmental Products Inc., Port Moody (CA)

( * ) Notice: Subject to any disclaimer, the term of this patent is extended or adjusted under 35 U.S.C. 154(b) by 0 days.

(21) Appl. No.: 19/083,811

(22) Filed: Mar. 19, 2025

(51) Int. Cl.
| | |
|---|---|
| *C08J 3/20* | (2006.01) |
| *B29B 7/28* | (2006.01) |
| *B29C 35/02* | (2006.01) |
| *B29C 37/00* | (2006.01) |
| *B29C 41/00* | (2006.01) |
| *B29C 41/02* | (2006.01) |
| *B29C 41/42* | (2006.01) |
| *B29C 41/46* | (2006.01) |
| *B29K 1/00* | (2006.01) |
| *B29K 33/04* | (2006.01) |
| *C08K 3/26* | (2006.01) |
| *C08K 5/053* | (2006.01) |
| *C08K 5/098* | (2006.01) |
| *C08K 5/138* | (2006.01) |
| *C11D 17/04* | (2006.01) |

(52) U.S. Cl.
CPC ............. *C08J 3/203* (2013.01); *B29B 7/283* (2013.01); *B29C 35/0266* (2013.01); *B29C 37/0092* (2013.01); *B29C 41/003* (2013.01); *B29C 41/02* (2013.01); *B29C 41/42* (2013.01); *B29C 41/46* (2013.01); *C08K 3/26* (2013.01); *C08K 5/053* (2013.01); *C08K 5/098* (2013.01); *C08K 5/138* (2013.01); *C11D 17/042* (2013.01); *B29K 2001/08* (2013.01); *B29K 2033/04* (2013.01); *B29K 2995/0062* (2013.01); *C08J 2301/02* (2013.01); *C08J 2433/02* (2013.01); *C08K 2003/262* (2013.01); *C11D 2111/14* (2024.01)

(58) Field of Classification Search
None
See application file for complete search history.

(56) References Cited

U.S. PATENT DOCUMENTS

| | | |
|---|---|---|
| 11,795,420 B2 | 10/2023 | Soane et al. |
| 11,932,829 B2 | 3/2024 | Soane et al. |
| 12,122,980 B2 | 10/2024 | Soane et al. |
| 2022/0403301 A1 | 12/2022 | Soane et al. |
| 2022/0412010 A1 | 12/2022 | Soane et al. |
| 2023/0227758 A1 | 7/2023 | Soane et al. |
| 2025/0059476 A1 | 2/2025 | Soane et al. |
| 2025/0066699 A1 | 2/2025 | Soane et al. |
| 2025/0075154 A1 | 3/2025 | Soane et al. |
| 2025/0092338 A1 | 3/2025 | Soane et al. |

FOREIGN PATENT DOCUMENTS

| | | |
|---|---|---|
| WO | 2022/261103 | 12/2022 |
| WO | 2025/038945 | 2/2025 |

OTHER PUBLICATIONS

Tru Earth, "Ingredients" www.tru.earth/Ingredients, Apr. 8, 2025, 5 pages.

*Primary Examiner* — Robert T Butcher
(74) *Attorney, Agent, or Firm* — DLA Piper LLP (US)

(57) ABSTRACT

Glycerin and sodium polyacrylate may be mixed at a first mixing speed for a first mixing time. Free water and a fibrillated cellulose mixture may be added to second mixer and mixed at a second mixing time speed for a second mixing time. The glycerin and the sodium polyacrylate may be mixed with the free water and fibrillated cellulose mixture at a third mixing speed for a third mixing time. One or more of sodium citrate, sodium bicarbonate, and sodium benzoate may be added and mixed at a fourth mixing speed for a fourth mixing time. Sodium carbonate may be added and mixed at a fifth mixing speed for a fifth mixing time. A surfactant mixture and optionally fragrances may be added and mixed at a sixth mixing speed for a sixth mixing time to form a final mixture, which may be transferred to molds, dehydrated, and removed.

18 Claims, 6 Drawing Sheets

PLASTIC-FREE DISHWASHER CLEANING PRODUCT

TECHNICAL FIELD

The present disclosure generally relates to the field of cleaning products, and more particularly to a method and apparatus for making plastic-free dissolvable cleaning products which can take any shape or form and may be suitable for use in any type of dishwasher.

BACKGROUND

The majority of conventional cleaning products for use in a dishwasher come in as a liquid or a powder in a vessel with a dispenser. These vessels are mostly made up of plastic. Even cardboard vessels are typically lined with plastic to serve as a water barrier. Single use plastic is wreaking havoc on the environment. Only a small percentage of all plastic is actually recycled, and packaging generates the largest portion of municipal waste. Packaged products are inefficient for businesses and the people who buy them.

Some dissolvable cleaning products (e.g., dishwasher pods) are typically made using plastics to either encapsulate and/or bind the cleaning product in its single use form. This presents a problem as the dishwasher pod plastics, once dissolved and/or broken down into microplastics, may enter the water supply and contribute to global pollution. In oceans alone, annual plastic pollution, from all types of plastics, was estimated at 4 million to 14 million tons in the early $21^{st}$ century. Not only are microplastics harmful to ocean and aquatic life, but they are also increasingly being detected in humans. The use of plastics in cleaning pods/packages used in dishwashers poses an acute problem as these plastics do not break down completely. Microplastics can remain on drinkware, plates, and cutlery, where it is ingested by humans.

These problems pose a threat on their own but also create frustration in consumers who embrace the concept of reducing impact on the environment with waste including packaging and transportation and may lead to a slower adoption by the general public. Thus, a need exists for formulations of plastic-free cleaning products for use in dishwashers that meet the needs of consumers, while also reducing the amount of waste generated in their production and shipping.

SUMMARY

Methods, systems, and apparatuses for forming dissolvable cleaning products. Glycerin and sodium polyacrylate may be mixed at a first mixing speed for a first mixing time. Free water and a fibrillated cellulose mixture may be added to second mixer and mixed at a second mixing time speed for a second mixing time. The glycerin and the sodium polyacrylate may be mixed with the free water and fibrillated cellulose mixture at a third mixing speed for a third mixing time. One or more of sodium citrate, sodium bicarbonate, and sodium benzoate may be added and mixed at a fourth mixing speed for a fourth mixing time. Sodium carbonate may be added and mixed at a fifth mixing speed for a fifth mixing time. A surfactant mixture and optionally fragrances may be added and mixed at a sixth mixing speed for a sixth mixing time to form a final mixture, which may be transferred to one or more molds, dehydrated, and removed from the one or more molds.

In an example, the dissolvable cleaning product without fragrance may include one or more of approximately 28.60 wt % to approximately 29.61 wt % total water, approximately 0.30 wt % of the fibrillated cellulose, approximately 2.52 wt % to approximately 3.53 wt % of surfactant solids, approximately 16.89 wt % of the sodium citrate, approximately 11.93 wt % of the sodium bicarbonate, approximately 26.55 wt % of the sodium carbonate, approximately 0.27 wt % of the sodium benzoate, approximately 10.84 wt % of the glycerin, and approximately 1.08 wt % of the sodium polyacrylate.

In another example, the dissolvable cleaning product with fragrance may include one or more of approximately 28.41 wt % to approximately 29.41 wt % total water, approximately 0.30 wt % of the fibrillated cellulose, approximately 2.52 wt % to approximately 3.53 wt % of the surfactant solids, approximately 16.89 wt % of the sodium citrate, approximately 11.93 wt % of the sodium bicarbonate, approximately 26.55 wt % of the sodium carbonate, approximately 0.27 wt % of the sodium benzoate, approximately 10.84 wt % of the glycerin, approximately 1.08 wt % of the sodium polyacrylate, and approximately 0.19 wt % of the one or more fragrances.

BRIEF DESCRIPTION OF THE DRAWINGS

The drawings described below are for illustration purposes only. The drawings are not intended to limit the scope of the present disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Liquid and powder cleaning products are known and in the market. A problem with these known forms of un-premeasured cleaning products is that consumers are required to measure out appropriate amounts from containers, which often leads to consumers using too much, or too little. Furthermore, the process of measuring out the liquid or powder is inconvenient, and messy, often leading to accidental spills. Additionally, conventional, un-premeasured powders and liquids are bulky and can require large and awkward containers to deliver enough cleaning product in a single package, which increases the costs of shipping and storing the products through the supply chain. These large containers may also be hard for consumers to handle, store, and use, and may burden the environment as a result of their disposal as solid waste. Typical vessels are mostly made up of plastic, glass, and/or cardboard lined with plastic to serve as a water barrier. Even recyclable vessels must be collected and transported to recycling sites to be sorted into like materials and only a small percentage of plastics are recyclable.

Attempts to overcome the problems associated with the liquid and powder cleaning products have led to the development of products containing pre-measured amounts in single use dosage forms, such as dissolvable tablets pouches containing, for example, liquid detergent (and often other cleaning aids), and detergent sheets. These dissolvable cleaning products have a relatively small footprint, resulting in substantially lower shipping and storage costs throughout the supply chain. Their small physical dimensions also make dissolvable cleaning products eco-friendly since far less carbon is generated from fossil fuel energy spent in transporting them from their place of manufacture to the ultimate consumer, as compared to their bulkier liquid, powder, and pouch counterparts.

However, conventional dishwasher dissolvable tablets and pouches are still typically made using plastics to either encapsulate and/or bind the cleaning product in its single use form. This presents a problem as the plastics, once dissolved, can enter the water supply and wreak and contribute to global pollution. Not only are microplastics harmful to ocean and aquatic life, but they are also increasingly being detected in humans. The use of plastics in dishwasher pods/packages poses an acute problem as these plastics do not break down completely. Microplastics can remain on drinkware, plates, and cutlery, where it is ingested by humans.

Accordingly, an improved method of forming dissolvable cleaning products, particularly suited for use in dishwashers, without any type of plastics in either the formulation or the packaging is desired. The following description contains examples of methods, systems, and apparatuses that produce plastics-free dissolvable cleaning products that can be formed into any desirable shape. The advantages of these dissolvable cleaning products over conventional solid and liquid cleansers include chemical stability, reduced packaging, and convenience for the consumer. While formulated for use in dishwashers, the dissolvable cleaning products and production methods may be used with a variety of concentrates, such as, without limitation, a bathroom cleaner, a multi-surface cleaner, a glass cleaner, a hand soap, a laundry detergent, or a dish soap. Examples of the dissolvable cleaning products are described below.

Figure 1:
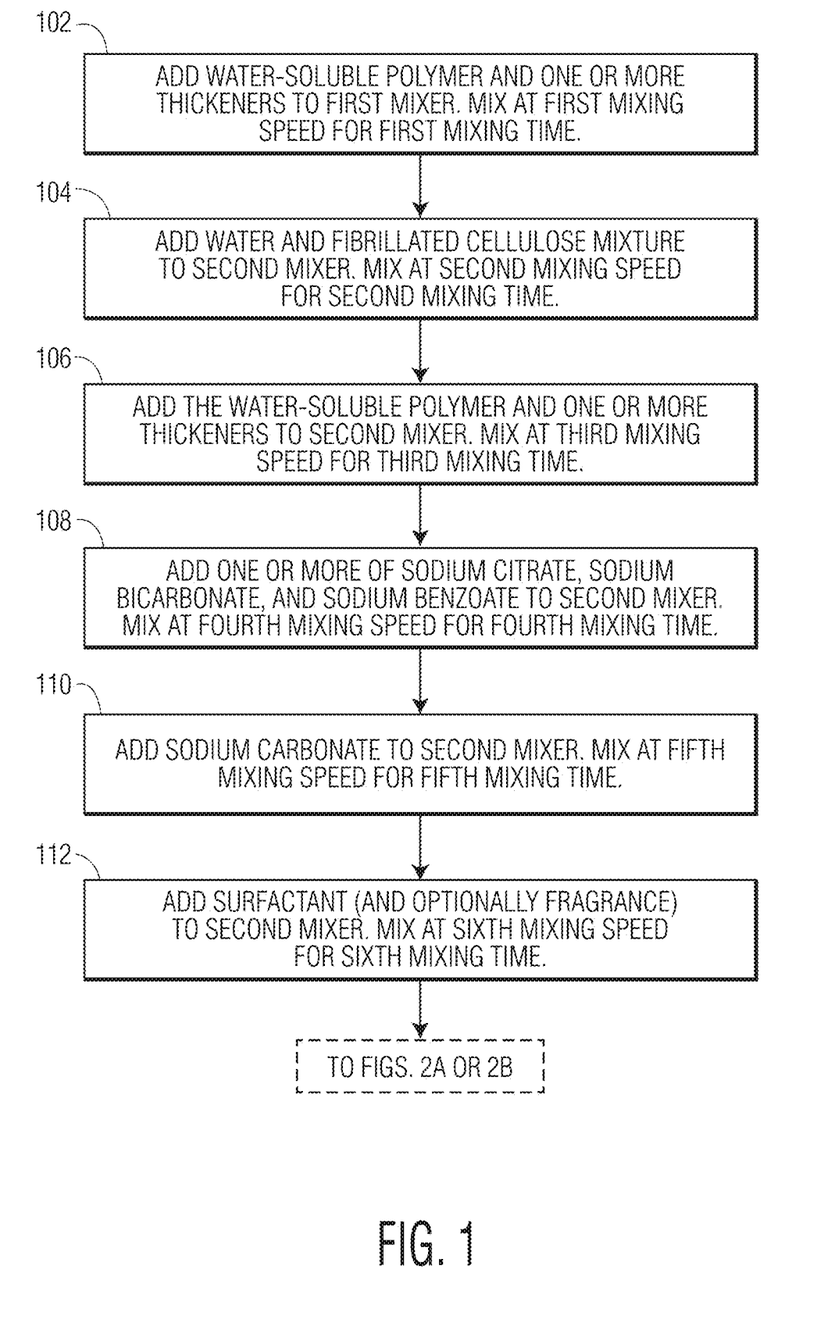
FIG. 1 is a flowchart illustrating a method of forming a final mixture for a dissolvable cleaning product, according to an example of the present disclosure.

Referring now to FIG. 1, a flowchart illustrating a method of forming an example of final mixture for a dissolvable cleaning product is shown.

In step 102, a water-soluble polymer and one or more thickeners may be added to a first mixer and mixed at a first mixing speed for a first mixing time.

In an example, the water-soluble polymer may range from approximately 8.65 wt % to approximately 13.00 wt % of the final mixture. In another example, the water-soluble polymer may range from approximately 9.73 wt % to approximately 11.92 wt % of the final mixture.

The water-soluble polymer may be glycerin (e.g., aqueous). As will be appreciated by persons skilled in the art, glycerin and water are commonly used to provide flexibility and elongation of polymers. However, while water evaporates, glycerin does not. The amount of glycerin may be increased to accommodate for various relative humidity conditions at the cleaning product manufacturing plant if relative humidity is not controlled. As will be appreciated, this consideration relates to glycerin-water hysteresis.

In an example, the one or more thickeners may range from approximately 0.87 wt % to approximately 1.30 wt % of the final mixture. In another example, the one or more thickeners may range from approximately 0.97 wt % to approximately 1.19 wt % of the final mixture. The one or more thickeners may include sodium polyacrylate.

The first mixing time may be approximately 5 minutes. However, it will be appreciated that a shorter mixing time may also yield acceptable results. Furthermore, the mixing time may be extended for a longer time if necessary. The first mixing speed may be a low speed. In an example, the first mixing speed may be approximately 113 rotations per minute (rpm). The first mixing may be conducted at room temperature. The first mixer may contain one or more mixing paddles configured to reduce the incorporation of gas bubbles during mixing and may also rotate the paddles in a specific pattern configured to reduce bubble formation and incorporation. The mixture of the water-soluble polymer and the one or more thickeners may be reserved.

At step 104, free water and a fibrillated cellulose mixture may be added to a second mixer and mixed at a second mixing speed for a second mixing time. In an example, the first mixer and the second mixer may be the same mixer. In this example, the mixture of the water-soluble polymer and the one or more thickeners formed in step 102 may be removed from the first mixer and transferred to a storage container. The first mixer may be optionally cleaned after the removal of the mixture of the water-soluble polymer and the one or more thickeners. In another example, the second mixer may be a separate mixer.

In an example, the free water may range from approximately 13.90 wt % to approximately 20.89 wt % of the final mixture. In another example, the free water may range from approximately 15.64 wt % to approximately 19.15 wt % of total ingredients of the final mixture. The free water may be de-ionized water.

In an example, the fibrillated cellulose mixture may range from approximately 8.04 wt % to approximately 12.08 wt % of the final mixture. In another example, the fibrillated cellulose mixture may range from approximately 9.05 wt % to approximately 11.08 wt % of the final mixture.

Cellulose, the most abundant organic material on earth, is the main component of plant stems, leaves, and roots. It is therefore a renewable material. The fibrillated cellulose mixture may be produced by processing wood fibers containing cellulose down to the smallest fiber components. The fibrillated cellulose mixture may be a mixture of one or more of cellulose micro fibrils ("CMF"), cellulose nano fibrils ("CNF"), and cellulose nano crystals ("CNC"), which may be collectively referred to as fibrillated cellulose. Dispersed in water, the fibrillated cellulose may form an extensive network through hydrogen bonding and mechanical entanglement. The formed network may stabilize particles in suspension and oil-in-water emulsions without an emulsifier.

The fibrillated cellulose mixture may include approximately 3 wt % of the fibrillated cellulose and approximately 97 wt % water.

The second mixing time may be approximately 17.5 minutes. However, it will be appreciated that a shorter mixing time may also yield acceptable results. Furthermore, the mixing time may be extended for a longer time if necessary. The second mixing speed may be a medium speed. In an example, the second mixing speed may be approximately 168 rpm. The second mixing may be conducted at room temperature. The second mixer may contain one or more mixing paddles configured to reduce the incorporation of gas bubbles during mixing and may also rotate the paddles in a specific pattern configured to reduce bubble formation and incorporation.

At step 106, the mixture of the water-soluble polymer and the one or more thickeners from step 102 may be added to the free water and fibrillated cellulose mixture in the second mixer and mixed at a third mixing speed for a third mixing time. The third mixing time may be approximately 3 minutes. However, it will be appreciated that a shorter mixing time may also yield acceptable results. Furthermore, the mixing time may be extended for a longer time if necessary. The third mixing speed may be a low speed. In an example, the third mixing speed may be approximately 113 rpm. The third mixing may be conducted at room temperature.

At step 108, one or more of sodium citrate, sodium bicarbonate, and sodium benzoate may be added to the second mixer and mixed at a fourth mixing speed for a fourth mixing time. In an example, the sodium citrate may range from approximately 13.48 wt % to approximately 20.25 wt % of the final mixture. In another example, the sodium citrate may range from approximately 15.16 wt % to approximately 18.56 wt % of the final mixture.

In an example, the sodium bicarbonate may range from approximately 9.52 wt % to approximately 14.30 wt % of the final mixture. In another example, the sodium bicarbonate may range from approximately 10.71 wt % to approximately 13.11 wt % of the final mixture.

In an example, the sodium benzoate may range from approximately 0.22 wt % to approximately 0.33 wt % of the final mixture. In another example, the sodium benzoate may range from approximately 0.24 wt % to approximately 0.30 wt % of the final mixture.

The fourth mixing time may be approximately 10 minutes. However, it will be appreciated that a shorter mixing time may also yield acceptable results. Furthermore, the mixing time may be extended for a longer time if necessary. The fourth mixing speed may be a medium speed. In an example, the fourth mixing speed may be approximately 168 rpm. The fourth mixing may be conducted at room temperature.

At step 110, sodium carbonate (e.g., monohydrate) may be added to the second mixer and mixed at a fifth mixing speed for a fifth mixing time. In an example, the sodium carbonate may range from approximately 20.18 wt % to approximately 31.77 wt % of the final mixture. In another example, the sodium carbonate may range from approximately 22.83 wt % to approximately 29.12 wt % of the final mixture.

The fifth mixing time may be approximately 10 minutes. However, it will be appreciated that a shorter mixing time may also yield acceptable results. Furthermore, the mixing time may be extended for a longer time if necessary. The fifth mixing speed may be a medium speed. In an example, the fifth mixing speed may be approximately 168 rpm. The fifth mixing may be conducted at room temperature.

At step 112, a surfactant mixture may be added to the second mixer and mixed at a sixth mixing speed for a sixth mixing time. The surfactant mixture may be an alkaline stable surfactant compound configured to deliver low foam detergency. The surfactant mixture may feature high alkaline hydrotrope properties of an anionic surfactant with low foam cloud point performance of a nonionic surfactant. The surfactant mixture may be a mixture of one or more components. In an example, the surfactant may be approximately 50 wt % to approximately 70% wt % of surfactant solids and approximately 30% to approximately 50% water. In an example, the surfactant may be Masurf® NF-10 manufactured and distributed by Pilot® Chemical Company.

In an example, the surfactant mixture may range from approximately 4.02 wt % to approximately 6.04 wt % of the final mixture. In another example, the surfactant mixture may range from approximately 4.52 wt % to approximately 5.54 wt % of the final mixture.

Optionally at step 112, one or more fragrances may be added to the second mixer and mixed at the sixth mixing speed for the sixth mixing time.

The one or more fragrances may include, for example, one or more of extract. In an example, the extract may be organic. For example, the one or more fragrancies may include organic lemongrass extract. The organic lemongrass may be an essential oil and may be steam extracted from fresh grass and roots of a lemongrass plant. In another example, the one or more fragrances may include conventional fragrances that are typically used in applications such as soap, detergents, and personal care applications (e.g., lotion, shampoo, and liquid soap). For example, the one or more fragrances may include fresh linen, such as the Fresh Linen Fragrance Oil distributed by Bulk Apothecary.

In an example, the one or more fragrances may range from approximately 0.13 wt % to approximately 0.19 wt % of the final mixture.

The sixth mixing time may be approximately 5 minutes. However, it will be appreciated that a shorter mixing time may also yield acceptable results. Furthermore, the mixing time may be extended for a longer time if necessary. The sixth mixing speed may be a medium speed. In an example, the sixth mixing speed may be approximately 168 rpm. The sixth mixing may be conducted at room temperature.

An example composition of the final mixture without fragrance is provided below in Table 1.

TABLE 1

Example Composition of the Final Mixture without Fragrance

| Component | Wt % |
| --- | --- |
| Free Water | 17.41 |
| Fibrillated Cellulose Mixture | 10.07 |
| Surfactant Mixture | 5.03 |
| Sodium Citrate | 16.87 |
| Sodium Bicarbonate | 11.92 |
| Sodium Carbonate | 25.52 |
| Sodium Benzoate | 0.27 |
| Glycerin | 10.83 |
| Sodium Polyacrylate | 1.08 |

An example composition of the final mixture with fragrance is provided below in Table 2.

TABLE 2

Example Composition of the
Final Mixture with Fragrance

| Component | Wt % |
|---|---|
| Free Water | 17.38 |
| Fibrillated Cellulose Mixture | 10.05 |
| Surfactant Mixture | 5.03 |
| Sodium Citrate | 16.85 |
| Sodium Bicarbonate | 11.90 |
| Sodium Carbonate | 26.47 |
| Sodium Benzoate | 0.27 |
| Glycerin | 10.82 |
| Sodium Polyacrylate | 1.08 |
| One or More Fragrances | 0.16 |

In an example, the final mixture may have a total moisture concentration (e.g., from the free water, the fibrillated cellulose mixture, and the surfactant mixture) of approximately 23.31 wt % to approximately 35.02 wt %. In another example, the final mixture may have a total moisture concentration of approximately 26.22 wt % to approximately 32.10 wt %. In yet another example, the final mixture may have a total moisture concentration of approximately 29.14 wt %. to approximately 29.19 wt %.

Figure 2A:
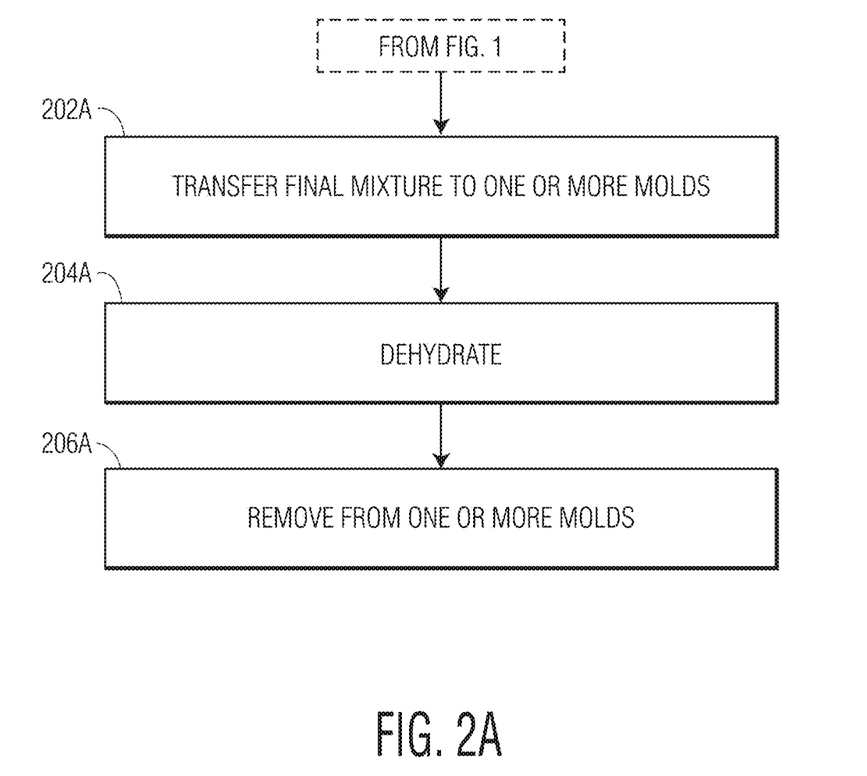
FIG. 2A is a flowchart illustrating a first example of a process that may be used to form the dissolvable cleaning product from the final mixture, according to an example of the present disclosure.

Referring now to FIG. 2A, a first example method of forming the dissolvable cleaning product from the final mixture is shown.

At step 202A, the final mixture may be transferred to one or more molds. In an example, the final mixture may be transferred directly to the one or more molds. The one or more molds may be of any desired shape to produce dissolvable cleaning products having a precise size, shape, and weight as required. In an example, the one or more molds may be approximately 5% larger than an intended size and shape of the dissolvable cleaning products to account for shrinkage. In an example the one or more molds may be located on a conveyer belt that moves the one or more molds as they are being filled with the final mixture.

At step 204A, the final mixture within the one or more molds may undergo a dehydration process to form the dissolvable cleaning product. The dehydration process may be performed at a temperature of approximately 140° F. for approximately 2 hours.

Depending on the conditions, the dissolvable cleaning products may contain varying residual amounts of water. In an example, the dissolvable cleaning products may have a total moisture content ranging from approximately 20 wt % to approximately 30 wt %.

At step 206A, the dissolvable cleaning product may be removed from the one or more molds. In an example, the one or more molds may be made of a malleable material (e.g., silicon) to ease the removal of the dissolvable cleaning product.

Figure 2B:
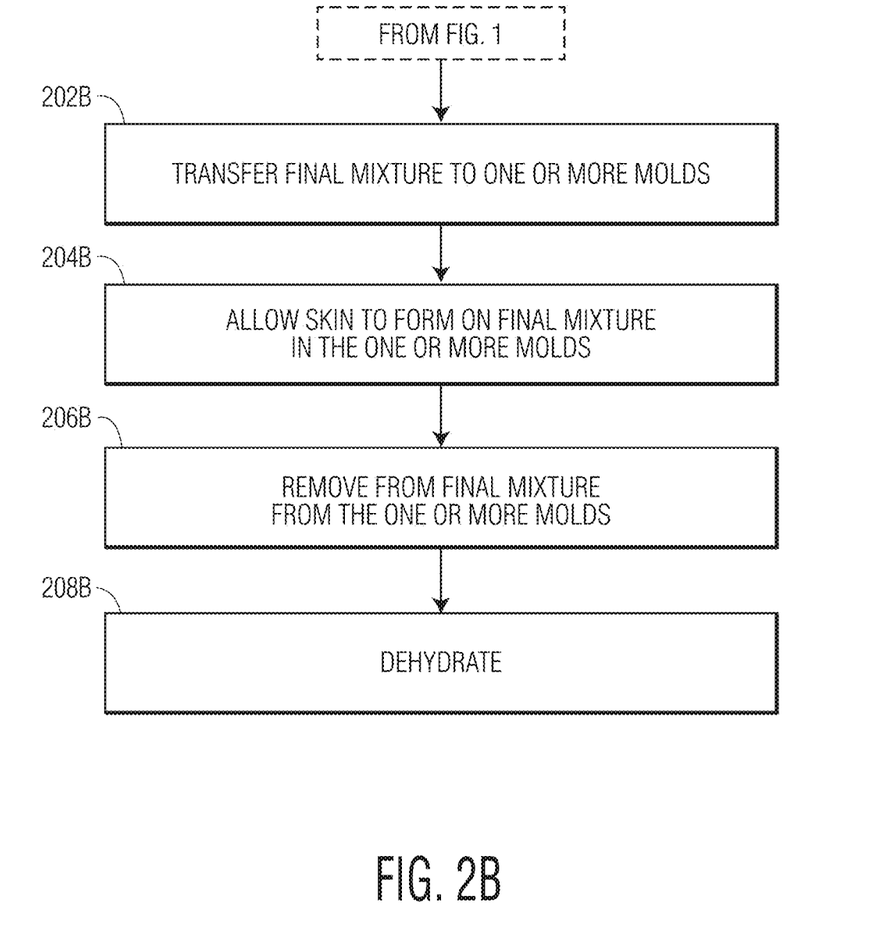
FIG. 2B is a flowchart illustrating a second example of a process that may be used to form the dissolvable cleaning product from the final mixture, according to an example of the present disclosure, according to an example of the present disclosure.

Referring now to FIG. 2B, a second example method of forming the dissolvable cleaning product from the final mixture is shown.

At step 202B, the final mixture may be transferred to the one or more molds. In an example, the final mixture may be transferred directly to the one or more molds. The one or more molds may be of any desired shape to produce dissolvable cleaning products having a precise size, shape, and weight as required. In an example, the one or more molds may be approximately 5% larger than an intended size and shape of the dissolvable cleaning products to account for shrinkage. In an example the one or more molds may be located on a conveyer belt that moves the one or more molds as they are being filled with the final mixture.

At step 204B, the final mixture may be allowed to sit in the one or more molds for a period of time. In an example, the period of time may range from approximately 3 hr to approximately 6 hr. Allowing the final mixture to sit in the one or more molds for the period of time may allow for a skin to form on the surface of the final mixture. The skin may have a consistency that is firmer than the final mixture and provides structural support to the final mixture such that it retains the shape of the one or more molds. The skin may may facilitate removal from the one or more molds. In addition, this "curing" step may ensure consistency in the subsequent dehydration process. For example, the curing step may ensure that the dehydration process does not exceed a predetermined period of time (e.g., 2 hr) to reach a desired moisture content.

At step 206B, the cured final mixture may be removed from the one or more molds. In an example, the one or more molds may be made of a malleable material (e.g., silicon) to ease the removal of the dissolvable cleaning product.

At step 208B, the removed and cured final mixture may undergo a dehydration process to form the dissolvable cleaning product. The dehydration process may be performed at a temperature of approximately 140° F. for approximately 2 hours.

Depending on the conditions, the dissolvable cleaning products may contain varying residual amounts of water. In an example, the dissolvable cleaning products may have a total moisture content ranging from approximately 20 wt % to approximately 30 wt %.

In an example, the dissolvable cleaning product without fragrance may include one or more of approximately 20.00 wt % to approximately 23.00 wt % total water, approximately 0.32 wt % to approximately 0.33 wt % of the fibrillated cellulose, approximately 5.30 wt % to approximately 5.48 wt % of surfactant solids, approximately 17.79 wt % to approximately 18.39 wt % of the sodium citrate, approximately 12.57 wt % to approximately 12.98 wt % of the sodium bicarbonate, approximately 26.91 wt % to approximately 27.79 wt % of the sodium carbonate, approximately 0.28 wt % to approximately 0.29 wt % of the sodium benzoate, approximately 11.42 wt % to approximately 11.79 wt % of the glycerin, and approximately 1.14 wt % to approximately 1.18 wt % of the sodium polyacrylate.

In another example, the dissolvable cleaning product without fragrance may include one or more of approximately 28.60 wt % to approximately 29.61 wt % total water, approximately 0.30 wt % of the fibrillated cellulose, approximately 2.52 wt % to approximately 3.53 wt % of the surfactant solids, approximately 16.89 wt % of the sodium citrate, approximately 11.93 wt % of the sodium bicarbonate, approximately 26.55 wt % of the sodium carbonate, approximately 0.27 wt % of the sodium benzoate, approximately 10.84 wt % of the glycerin, and approximately 1.08 wt % of the sodium polyacrylate.

In an example, the dissolvable cleaning product with fragrance may include one or more of approximately 20.00 wt % to approximately 23.00 wt % total water, approximately 0.31 wt % to approximately 0.32 wt % of the fibrillated cellulose, approximately 5.25 wt % to approximately 5.42 wt % of the surfactant solids, approximately 17.57 wt % to approximately 18.14 wt % of the sodium citrate, approximately 12.41 wt % to approximately 12.81 wt % of the sodium bicarbonate, approximately 27.61 wt % to approximately 28.50 wt % of the sodium carbonate, approximately 0.28 wt % to approximately 0.29 wt % of the sodium benzoate, approximately 11.28 wt % to approximately 11.65 wt % of the glycerin, approximately 1.13 wt % to approximately 1.16 wt % of the sodium polyacrylate, and approximately 0.17 wt % of the one or more fragrances.

In another example, the dissolvable cleaning product with fragrance may include one or more of approximately 28.41 wt % to approximately 29.41 wt % total water, approximately 0.30 wt % of the fibrillated cellulose, approximately 2.52 wt % to approximately 3.53 wt % of the surfactant solids, approximately 16.89 wt % of the sodium citrate, approximately 11.93 wt % of the sodium bicarbonate, approximately 26.55 wt % of the sodium carbonate, approximately 0.27 wt % of the sodium benzoate, approximately 10.84 wt % of the glycerin, approximately 1.08 wt % of the sodium polyacrylate, and approximately 0.19 wt % of the one or more fragrances.

Figure 3A:
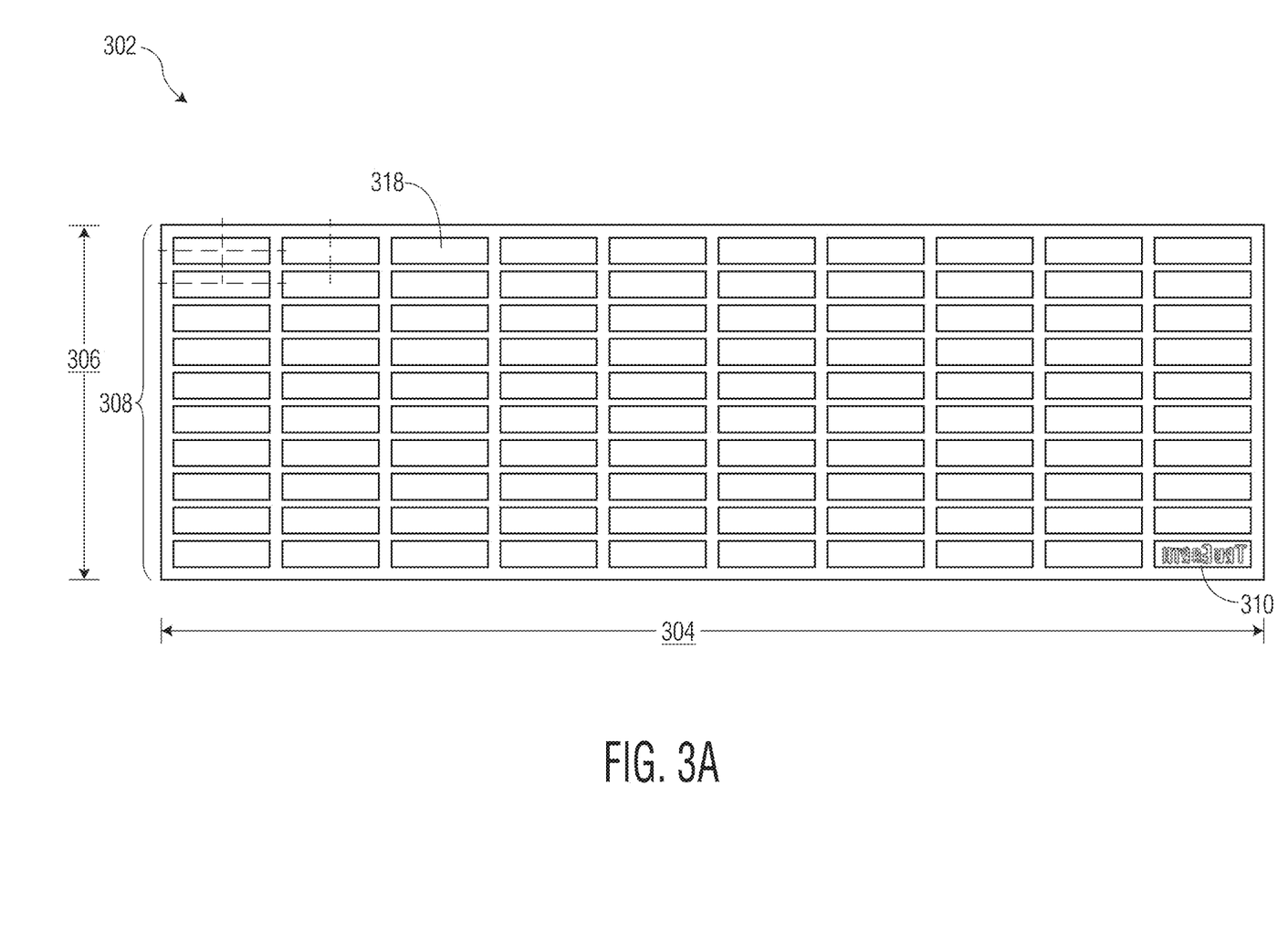
FIG. 3A is a top view of an example mold, according to an example of the present disclosure.
Figure 3B:
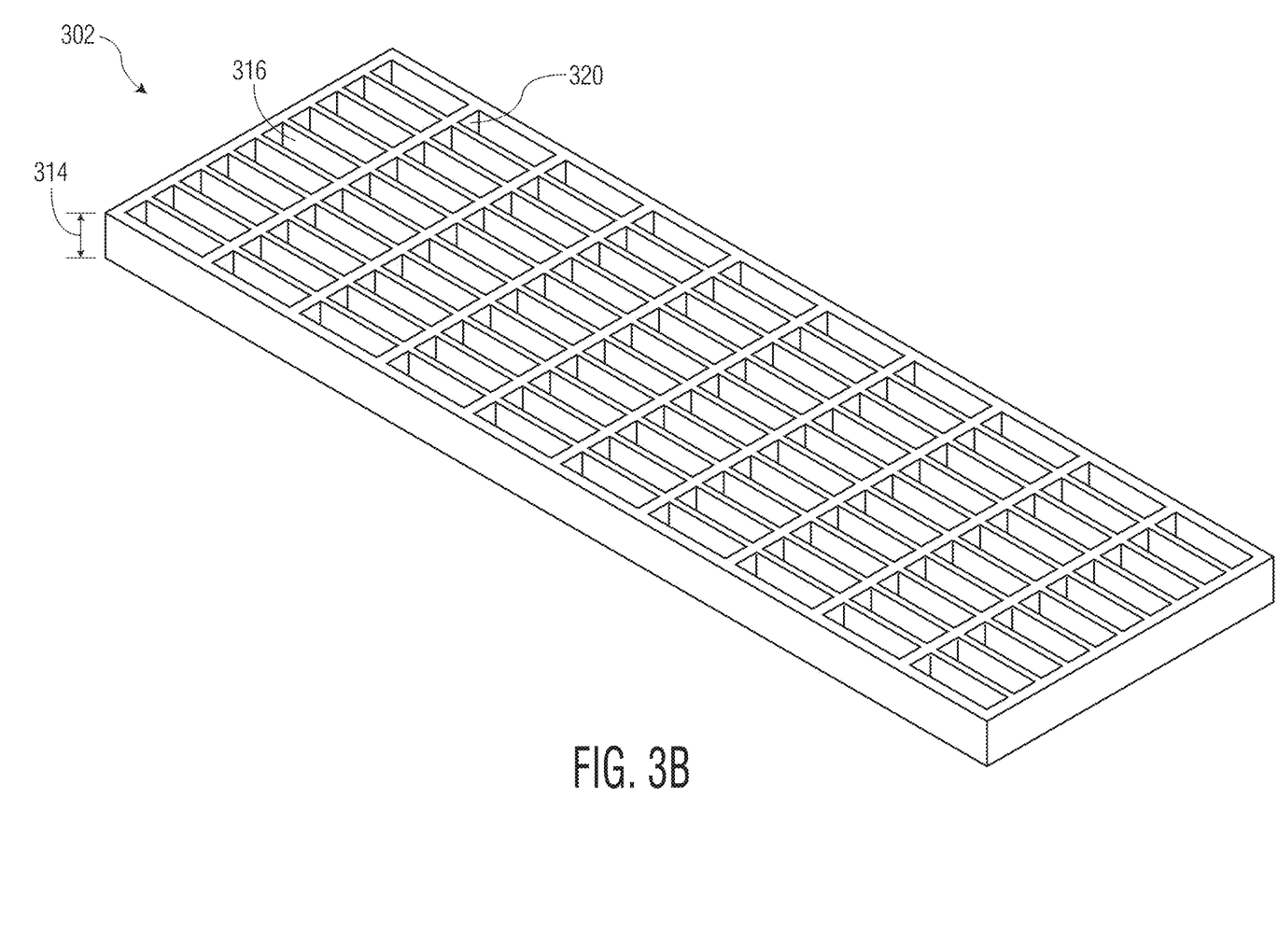
FIG. 3B is perspective view of the example mold, according to an example of the present disclosure.

Referring now to FIGS. 3A-3B, different views of an example mold 302 of the one or more molds are shown. FIG. 3A is a top view of the mold 302. The mold 302 may have a length 306 of approximately 13.8 cm and a width 304 of approximately 43.2 cm. The mold 302 may include one or more divisions 308 and one or more subdivisions 318 that produce any number of pieces (e.g., tablets) of the dissolvable cleaning product. The one or more subdivisions 318 may have a length of approximately 1.0 cm and a width of approximately 3.7 cm. The one or more subdivisions 318 may be separated by a length of approximately 0.3 cm and a width of approximately 0.6 cm. In an example, a bottom surface 310 of one or more of the one or more subdivisions 318 may be embossed/debossed to produce an impression or raised design in the dissolvable cleaning product.

FIG. 3B is a perspective view of the mold 302. The mold 302 may have a height 314 of approximately 1.9 cm. Each division 308 may be defined by a division wall 320 having a height approximately equivalent to the height of the mold 302. Each subdivision 318 may be separated by a rib 316 having a height approximately equivalent to the height of the mold 302. Although FIGS. 3A-3B show the one or more divisions 308 with ten subdivisions 318, any size, shape, and number of the one or more divisions 308 and any size, shape, and number of the one or more subdivisions 318 are contemplated.

Figure 4A:
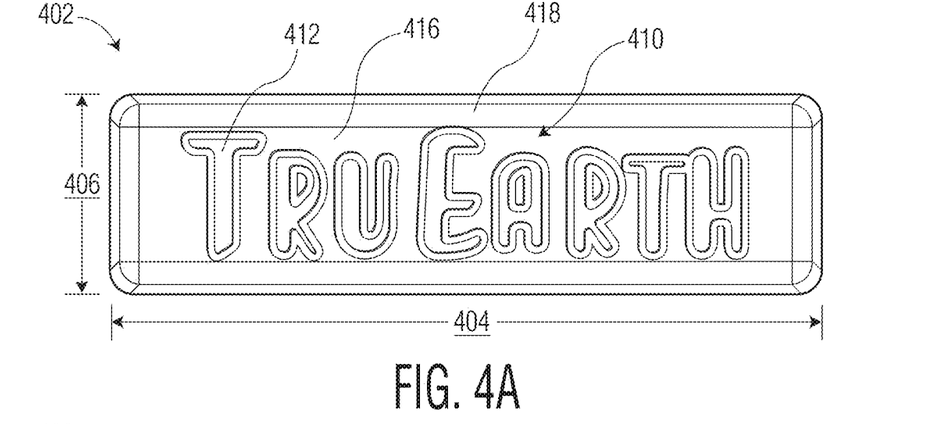
FIG. 4A is a top view of an example of a dissolvable cleaning product, according to an example of the present disclosure.
Figure 4B:
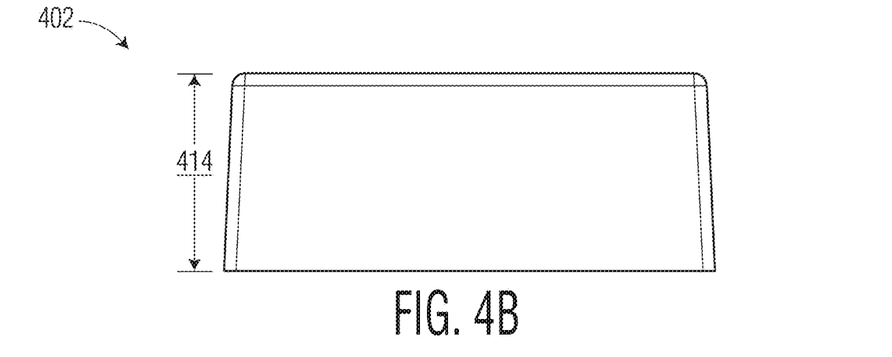
FIG. 4B is a side view of the dissolvable cleaning product, according to an example of the present disclosure.
Figure 4C:
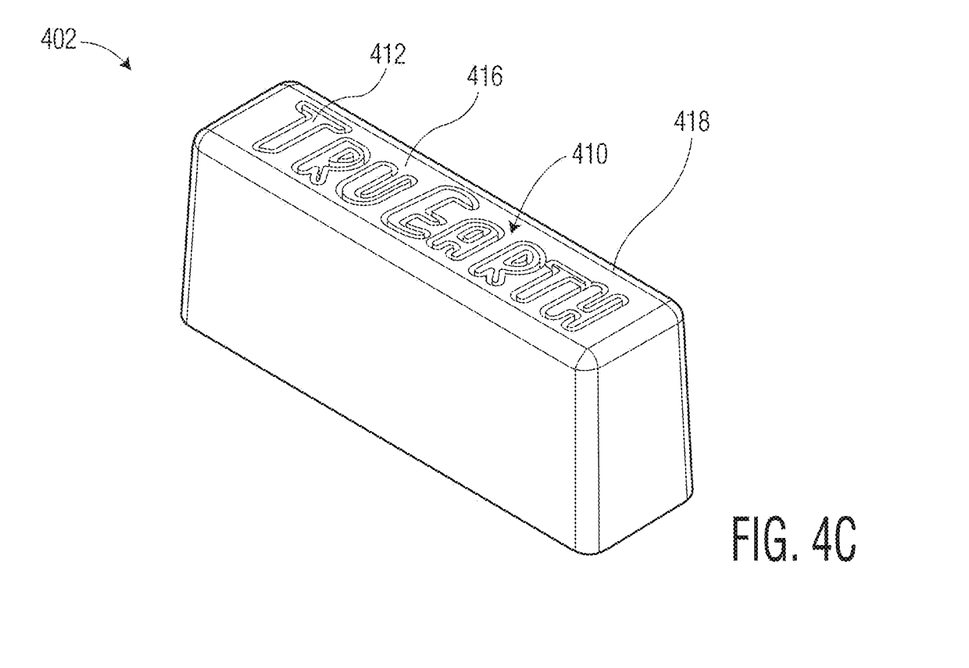
FIG. 4C is a perspective view of the dissolvable cleaning product, according to an example of the present disclosure.

Referring now to FIGS. 4A-4C, different views of a dissolvable cleaning product 402 made from the mold 302 is shown. FIG. 4A is a top view of the dissolvable cleaning product 402. FIG. 4B is a side view of the dissolvable cleaning product 402. FIG. 4C is a perspective view of the dissolvable cleaning product 402.

The dissolvable cleaning product 402 may have a length 406 and width 404 corresponding to the length and width of the one or more subdivisions 318. In an example, the dissolvable cleaning product 402 may have a length 406 of approximately 1.0 cm and a width 404 of approximately 3.7 cm. The dissolvable cleaning product 402 may have a height corresponding the height of the mold 302. In an example, the dissolvable cleaning product 402 may have a height 414 of approximately 1.5 cm. The sides of the dissolvable cleaning product 402 may have a slope of approximately 2°, such that the dissolvable cleaning product is slightly wider at the base. In an example, one or more of the dissolvable cleaning products may include a design 410, which may include one or more of an impression and a raised area, from the embossed/debossed bottoms surface 310 of the one or more molds. As shown in FIGS. 4A and 4C the design 410 may include a logo 412, which may be one or more of text or an design, that is embossed in a flat surface 416, surrounded by a raised lip 418.

After removal from the one or more molds, the dissolvable cleaning products may be packaged. The uniformity in size and weight of the dissolvable shape made from the process described above makes packaging much easier and economical, with maximum performance. The dimensions of the dissolvable shapes are selected such that the desired ease of handling, dosage, solubility, and packaging are ensured. In an example, the packaging may reduce or prevent ambient humidity from affecting the dissolvable cleaning products.

It will be appreciated that the viscosity and density of the final mixture may control dimensions of the final mixture cleaning product shape applied to the conveyor surface upon exiting the chilled extruder, and ultimately the dimensions of the dissolvable cleaning products. If the viscosity of the final solution is too low, additional amounts of the one or more thickeners may be added to the mixture to increase the viscosity to the desired viscosity range. If the viscosity of the final mixture is too high, additional free water may be added to the final mixture to reduce the viscosity to the desired viscosity range.

It is important to note this methodology and formulation can be adjusted to make almost any shape of final product, and the composition of the dissolvable cleaning products may be adjusted for various uses of cleaning products.

Additionally, these products can include those added to bottles and/or containers where it is best to apply as them as liquids. Products such as dish, handwashing, body, shampoos, auto, pets, pressure washers and any application where such a product is currently supplied in liquid bottles and/or containers, thereby reducing waste from such bottles and/or containers.

It will be appreciated by persons skilled in the art that it may be desirable to add fragrances, dyes, as well as other chemicals, such as for example, optical brighteners, enzymes, fabric softeners, bleaches, water softening agents, chelates, soil anti-redeposition agents, color-protecting agents, dye-transfer agents, known in the art, or later discovered, to impart expected characteristics or qualities to the resulting cleaning products. All such modifications to the additional components are comprehended by the present disclosure.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, may be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession may be executed substantially concurrently or the blocks may sometimes be executed in the reverse order, depending upon the functionality/acts involved.

Those skilled in the art will recognize that the methods and systems of the present disclosure may be implemented in many manners and as such are not to be limited by the foregoing examples. In other words, functional elements being performed by single or multiple components, in various combinations of hardware and software or firmware, and individual functions, may be distributed among software applications at either the client level or server level or both. In this regard, any number of the features of the different examples described herein may be combined into single or multiple examples, and alternate examples having fewer than, or more than, all of the features described herein are possible.

Functionality may also be, in whole or in part, distributed among multiple components, in manners now known or to become known. Thus, a myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the examples of methods presented and described as flowcharts in this disclosure are provided by way of example in order to provide a more complete understanding of the technology. The disclosed methods are not limited to the operations and logical flow presented herein. Alternative examples are contemplated in which the order of the various operations is altered and in which sub-operations described as being part of a larger operation are performed independently.

While various examples have been described for purposes of this disclosure, such examples should not be deemed to limit the teaching of this disclosure to those examples. Various changes and modifications may be made to the elements and operations described above to obtain a result that remains within the scope of the systems and processes described in this disclosure.

What is claimed is:

1. A method of forming a final mixture for a dissolvable cleaning product, the method comprising:
   adding glycerin and sodium polyacrylate to a first mixer and mixing at a first mixing speed for a first mixing time;
   adding water and a fibrillated cellulose mixture to a second mixer and mixing at a second mixing time speed for a second mixing time;
   adding the glycerin and the sodium polyacrylate to the second mixer and mixing at a third mixing speed for a third mixing time;
   adding one or more of sodium citrate, sodium bicarbonate, and sodium benzoate to the second mixer and mixing at a fourth mixing speed for a fourth mixing time;
   adding sodium carbonate to the second mixer and mixing at a fifth mixing speed for a fifth mixing time; and
   adding a surfactant mixture to the second mixer and mixing at a sixth mixing speed for a sixth mixing time to form the final mixture.

2. The method of claim 1, further comprising:
   transferring the final mixture to one or more molds;
   dehydrating the final mixture in the one or more molds to form the dissolvable cleaning product; and
   removing the dissolvable cleaning product from the one or more molds.

3. The method of claim 2, wherein the dehydrating reduces a total moisture content of the final mixture to a range of approximately 20 wt % to approximately 30 wt %.

4. The method of claim 1, further comprising:
   transferring the final mixture to one or more molds;
   allowing the final mixture to cure in the one or more molds such that a skin forms, the skin having a consistency that is firmer than the final mixture;
   removing the cured final mixture from the one or more molds; and
   dehydrating the cured final mixture to form the dissolvable cleaning product.

5. The method of claim 4, wherein the dehydrating reduces a total moisture content of the final mixture to a range of approximately 20 wt % to approximately 30 wt %.

6. The method of claim 1, wherein the glycerin is approximately 8.65 wt % to approximately 13.00 wt % of the final mixture.

7. The method of claim 1, wherein the sodium polyacrylate is approximately 0.87 wt % to approximately 1.30 wt % of the final mixture.

8. The method of claim 1, wherein the free water is approximately 13.90 wt % to approximately 20.89 wt % of the final mixture.

9. The method of claim 1, wherein the fibrillated cellulose mixture is approximately 8.04 wt % to approximately 12.08 wt % of the final mixture.

10. The method of claim 1, wherein the sodium citrate is approximately 13.48 wt % to approximately 20.25 wt % of the final mixture.

11. The method of claim 1, wherein the sodium bicarbonate is approximately 9.52 wt % to approximately 14.30 wt % of the final mixture.

12. The method of claim 1, wherein the sodium benzoate is approximately 0.22 wt % to approximately 0.33 wt % of the final mixture.

13. The method of claim 1, wherein the sodium carbonate is approximately 20.18 wt % to approximately 31.77 wt % of the final mixture.

14. The method of claim 1, wherein the surfactant mixture comprises an alkaline stable compound configured to deliver low foam detergency.

15. The method of claim 1, wherein the surfactant mixture is approximately 4.02 wt % to approximately 6.04 wt % of the final mixture.

16. The method of claim 1, further comprising:
   adding one or more fragrances with the surfactant mixture, the one or more fragrances approximately 0.13 wt % to approximately 0.19 wt % of the final mixture.

17. The method of claim 1, wherein:
one or more of the first mixing speed and the third mixing speed is approximately 113 rotations per minute (rpm); and
one or more of the second mixing speed, the fourth mixing speed, the fifth mixing speed, and the sixth mixing speed is approximately 168 rpm.

18. The method of claim 1, wherein:
one or more of the first mixing time, the fourth mixing time, and the sixth mixing time is approximately 5 min;
the second mixing time is approximately 17.5 min;
the third mixing time is approximately 3 min; and
the fifth mixing time is approximately 10 min.

* * * * *